(12) United States Patent
D'Amico et al.

(10) Patent No.: US 9,274,599 B1
(45) Date of Patent: Mar. 1, 2016

(54) INPUT DETECTION

(71) Applicants: Sam D'Amico, Mountain View, CA (US); Thad Eugene Starner, Mountain View, CA (US)

(72) Inventors: Sam D'Amico, Mountain View, CA (US); Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 135 days.

(21) Appl. No.: 13/764,489

(22) Filed: Feb. 11, 2013

(51) Int. Cl.
*G09G 5/00* (2006.01)
*G06F 3/01* (2006.01)

(52) U.S. Cl.
CPC ..................... *G06F 3/013* (2013.01)

(58) Field of Classification Search
CPC .. G06F 3/013; G02B 27/0093; G02B 27/017; G02B 2027/0178; G02B 2027/0187
USPC ........ 345/7–11, 156–184; 340/815.4–815.92; 382/117
See application file for complete search history.

(56) References Cited

U.S. PATENT DOCUMENTS

| | | | |
|---|---|---|---|
| 6,735,328 B1 * | 5/2004 | Helbing et al. | 382/117 |
| 8,223,024 B1 | 7/2012 | Petrou | |
| 8,235,529 B1 | 8/2012 | Raffle et al. | |
| 2003/0137515 A1 * | 7/2003 | Cederwall et al. | 345/473 |
| 2003/0146901 A1 * | 8/2003 | Ryan | 345/158 |
| 2007/0121066 A1 * | 5/2007 | Nashner | 351/210 |
| 2010/0039218 A1 * | 2/2010 | Cohen et al. | 340/5.8 |
| 2011/0115703 A1 * | 5/2011 | Iba et al. | 345/156 |
| 2012/0200488 A1 | 8/2012 | Osterhout et al. | |
| 2013/0088507 A1 * | 4/2013 | White | 345/592 |
| 2013/0169533 A1 * | 7/2013 | Jahnke | 345/158 |
| 2013/0300636 A1 * | 11/2013 | Cunningham et al. | 345/8 |
| 2013/0342672 A1 * | 12/2013 | Gray et al. | 348/78 |

* cited by examiner

*Primary Examiner* — Michael Pervan
*Assistant Examiner* — Andrew Lee
(74) *Attorney, Agent, or Firm* — McDonnell Boehnen Hulbert & Berghoff LLP

(57) ABSTRACT

The present disclosure provides a computer-implemented method. The method can include receiving eye-scan data from one or more linear sensors while operating in a locked mode, wherein the eye-scan data corresponds to an eye. The method can also include determining that the eye-scan data matches predetermined authorization data. Responsive to determining that the eye-scan data matches the predetermined authorization data, the method can also include causing the computing device to switch from operating in the locked mode to operating in an unlocked mode.

19 Claims, 15 Drawing Sheets

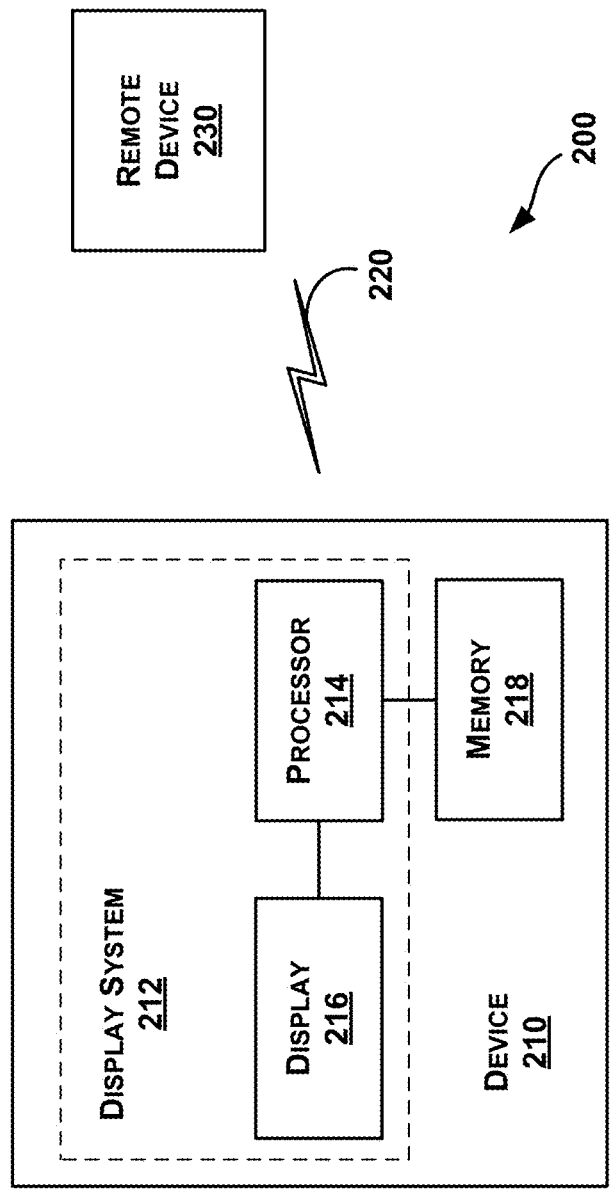

INPUT DETECTION

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

In one aspect, the present disclosure provides a computer-implemented method. The method can include receiving eye-scan data from one or more linear sensors while operating in a locked mode, wherein the eye-scan data corresponds to an eye. The method can also include determining that the eye-scan data matches predetermined authorization data. Responsive to determining that the eye-scan data matches the predetermined authorization data, the method can also include causing the computing device to switch from operating in the locked mode to operating in an unlocked mode.

In another aspect, the present disclosure provides computing device comprising one or more linear sensors directed at an eye, a non-transitory computer-readable medium, and program instructions. The program instructions may be stored on the non-transitory computer-readable medium and executable by at least one processor. The program instructions can be configured to receive eye-scan data from one or more linear sensors while operating in a locked mode, wherein the eye-scan data corresponding to an eye. The program instructions can also be configured to determine that the eye-scan data matches predetermined authorization data. Responsive to determining that the eye-scan data matches the predetermined authorization data, the program instructions can also be configured to cause the computing device to switch from operating in the locked mode to operating in an unlocked mode.

In yet another aspect, the present disclosure provides a computer-readable medium storing instructions that, when executed by one or more processors in a computing device, cause the computing device to perform functions. The functions can include receiving eye-scan data from one or more linear sensors while operating in a locked mode, wherein the eye-scan data corresponds to an eye. The functions can also include determining that the eye-scan data matches predetermined authorization data. Responsive to determining that the eye-scan data matches the predetermined authorization data, the functions can also include causing the computing device to switch from operating in the locked mode to operating in an unlocked mode.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 2 is a simplified block diagram of a computing device according to an example embodiment.

DETAILED DESCRIPTION

Figure 1A:
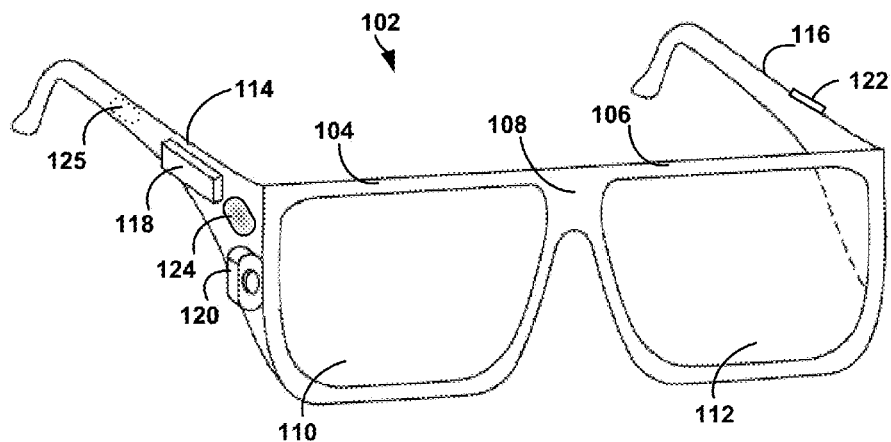
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A. OVERVIEW

Example embodiments may generally relate to a computing device with one or more high-resolution linear sensors directed at the eye of a user. For instance, a head-mountable device (HMD) may include inward facing linear sensors that are arranged to sense one or both of the wearer's eyes.

Arranged as such, linear sensors may capture data that is related to eye, which can be used for various purposes. In an example embodiment, an eye-scan process may involve piecing together image data acquired as a sensor moves relative to the eye to form an image of the eye. In particular, the one or more linear sensors may be used to detect dark or light spots in the eye of the user. The computing device can then estimate the location of the pupil based on the pattern of dark or light spots that is generated during an eye scan.

Images of the eye that are generated via eye scans can be used for other purposes. For instance, a head-mountable device may use an eye-scan process for authentication purposes. Authentication via an eye scan may help the computing device quickly customize content for a particular user, without having to ask for other forms of authentication (e.g., password, swipe pattern, etc.). In addition, an authentication process based on an eye-scan may be used to unlock a computing device.

In a further aspect, a computing device may also use eye-scan data from one or more linear sensors to track the gaze of a user. Specifically, by locating the pupil in an image of the eye, the computing device may determine a direction the wearer is looking. Further, by tracking the location of the pupil over a number of eye scans, the computing device may determine how the eye is moving. Gaze tracking may be useful for various purposes, such as providing a gaze-based user interface. In particular, for some tasks, a gaze-based user interface may provide benefits over other interfaces, such as those that allow a user to provide input with their hands or voice.

Providing authentication and gaze tracking functions with the use of one or more linear sensors may help to provide for higher-resolution images of the eye, with less bandwidth and space concerns as compared with existing technology, such as laser sensors or cameras. Another possible advantage of linear sensors is the smaller size of linear sensors, as compared to existing technologies. A linear sensor is often more compact and has a geometry that is easier to integrate into small devices. In addition, linear sensors may be significantly less expensive, and use less power, as compared to sensors used in other eye-scanning systems, such as lasers or cameras. Yet another advantage over laser sensors is that with linear sensors, no bright lights are used in the imaging and authentication process. Other advantages over camera-based and/or laser-based systems are also possible.

Further, in eye-scan systems that employ lasers to perform an eye scan, the lasers may only sense a portion of the eye at a given point in time. As such, to build an image of the eye, laser eye scanners have typically included mechanically moveable lasers. Accordingly, to facilitate an eye scan with such a system, a user typically holds their eye still while the lasers are moved across the surface of their eye.

In an example embodiment, a linear sensor or sensors may similarly sense only a portion of the eye at a given point in time. However, in some embodiments, the linear sensors may be fixedly attached to the computing device. Therefore, instead of moving the linear sensors across the eye, the computing device may prompt the user to move their eye such that the eye passes across the fixed linear sensors. This fixed-sensor configuration may achieve substantially the same result as physically moving the linear sensors. However, using fixed linear sensors may reduce the cost, size, and/or complexity of an eye-scan system.

A number of eye-scan prompts or cues can be used to indicate that the user should move their eye across the linear sensor(s). In one embodiment, an HMD may direct a user to track a graphic object that moves across the display of the HMD. The movement of the object may be such that by following the object causes the user's eye to move in a predictable manner, such that the eye can be read by the one or more linear sensors.

In another embodiment, an HMD may display a graphic object as the user rotates his or her head, creating the illusion that the object is fixed in physical space at a significant distance away from the user. The user tracks the object with his or her eyes exploiting the vestibulo-ocular reflex, which results in more stable eye movements. Yet another embodiment is to prompt the user to perform one or more hand gestures to exploit the vesitbulo-ocular reflex. Other embodiments are possible as well.

In a further aspect, a computing device may include a second linear sensor or a second group of linear sensors, which are oriented differently from a first linear sensor or group of linear sensors. In particular, the first linear sensor(s) may be oriented orthogonally or in another manner with respect to the second linear sensor(s), such that the computing device can use the linear sensors to acquire two-dimensional eye data. This may allow an HMD to track the gaze of the wearer, for example. Further, by providing eye data on one axis for each linear sensor, such an arrangement may help to improve the resolution of the image of the eye, which in turn may improve the ability of the device to identify features of the eye to authenticate a particular user.

Further, the fact that the linear sensor(s) for each axis in a two-dimensional arrangement can be separated, may allow for easier integration of the linear sensors in certain smaller devices. In addition, the separation of the linear sensors may allow for variants of three-dimensional vision techniques to recover more information about the structure of the eye (e.g., using passive or active lighting, small baseline disparity, etc.).

It should be understood that the above examples of the method are provided for illustrative purposes, and should not be construed as limiting.

B. EXAMPLE WEARABLE COMPUTING DEVICES

Systems and devices in which example embodiments may be implemented will now be described in greater detail. In one embodiment, an example computing device may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

Figure 1B:
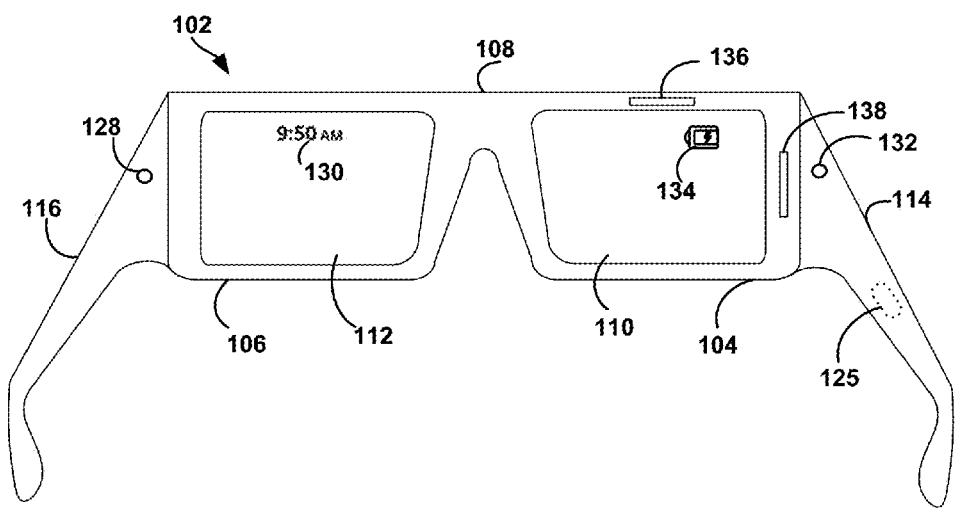
FIG. 1B illustrates an alternate view of the wearable computing device illustrated in FIG. 1A.

As a further example, HMD 102 may interpret eye movement as user input. In particular, HMD 102 may include one or more inward-facing image capture devices and/or one or more other inward-facing sensors (as shown in FIG. 1B) that may be used to track eye movements, authenticate a user, and/or determine the direction of a user's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

HMD 102 may also include one or more inward-facing high-resolution linear sensors 136, 138 directed at the eye of the user. While two linear sensors 136, 138 are shown in FIG. 1B, in another embodiment only one sensor may be used. As shown in FIG. 1B, the linear sensor(s) 136, 138 may be embedded within the frame element 104 of the HMD 102. In another embodiment, the linear sensor(s) 136, 138 may be integrated into the lens element 110 of the HMD. The linear sensor(s) 136, 138 may be located at any location where the linear sensors 136, 138 can be directed at the eye of the user. Various types of linear sensors may be employed, depending on the particular implementation. In one embodiment, charge-coupled device (CCD) linear image sensors may be used. In another embodiment, complementary metal-oxide-semiconductor (CMOS) linear sensors may be used. Such linear sensors are one-dimensional linear arrays. Other embodiments, including customized one-dimensional linear sensors, are possible as well.

Figure 1C:
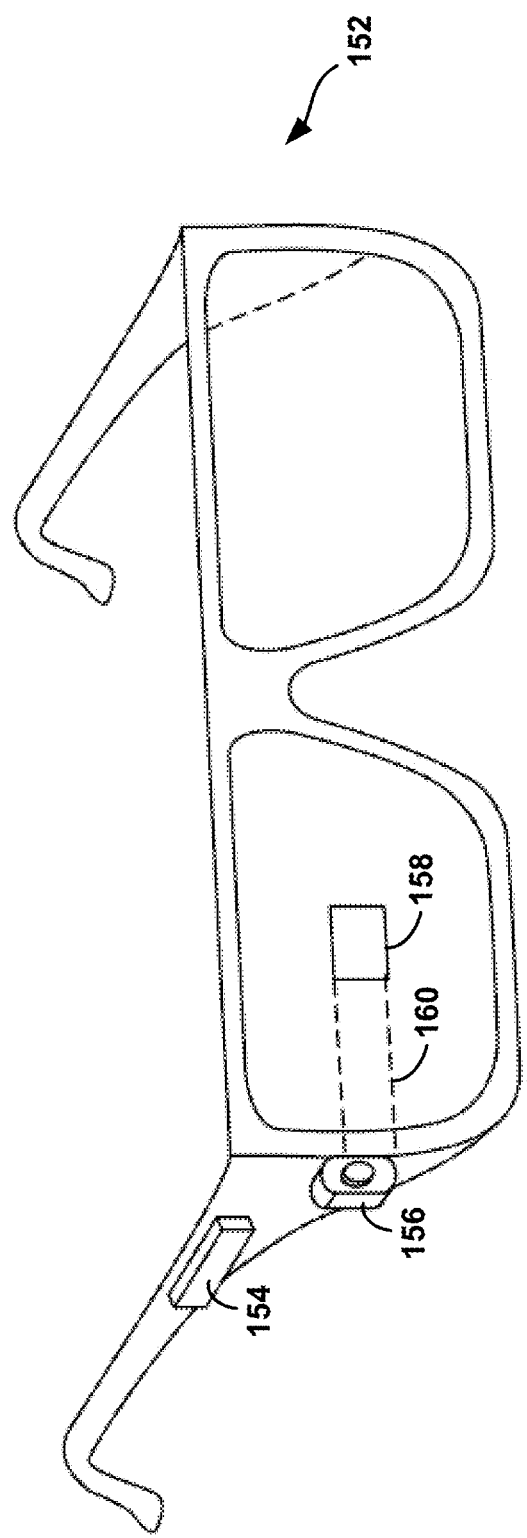
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
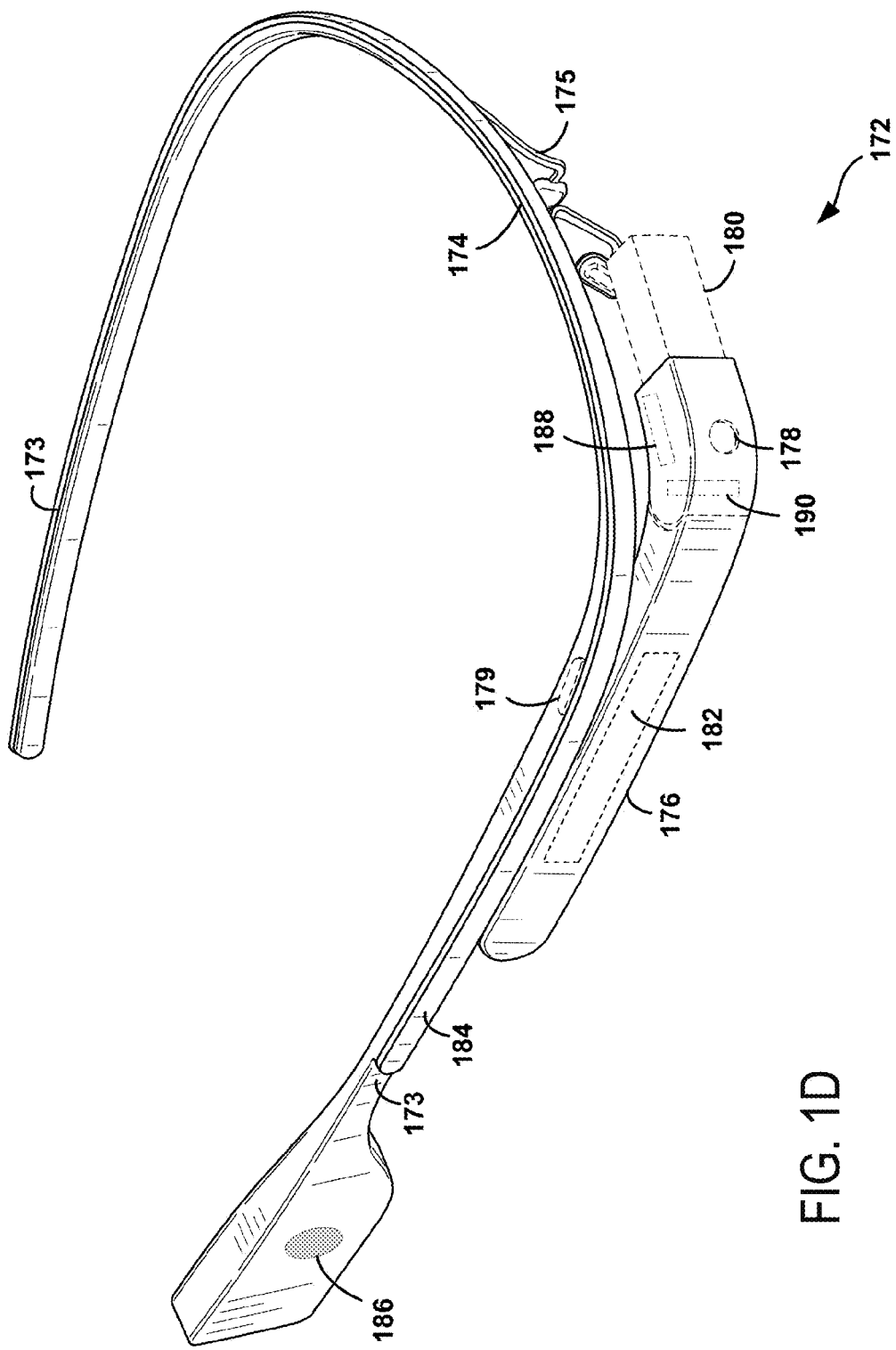
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system 182, an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

HMD 172 may also include one or more inward-facing high-resolution linear sensors 188, 190 directed at an eye of the user. While two linear sensors 188, 190 are shown in FIG. 1D, in another embodiment only one linear sensor may be used. As shown in FIG. 1D, the linear sensor(s) 188, 190 may be embedded within curved inside (head side) corner of the HMD 172. In another embodiment, the linear sensor(s) 188, 190 may be integrated into the display 180 of the HMD 172. In yet another embodiment, the linear sensor(s) 188, 190 may be embedded within the frame support 174. The linear sensor(s) 188, 190 may be located at any location where the linear sensor(s) 188, 190 can be directed at the eye of the user. Various types of linear sensors may be employed, depending on the particular implementation. In one embodiment, charge-coupled device (CCD) linear image sensors may be used. In another embodiment, complementary metal-oxide-semiconductor (CMOS) linear sensors may be used. Such linear sensors are one-dimensional linear arrays. Other embodiments, including customized one-dimensional linear sensors, are possible as well.

Figure 1E:
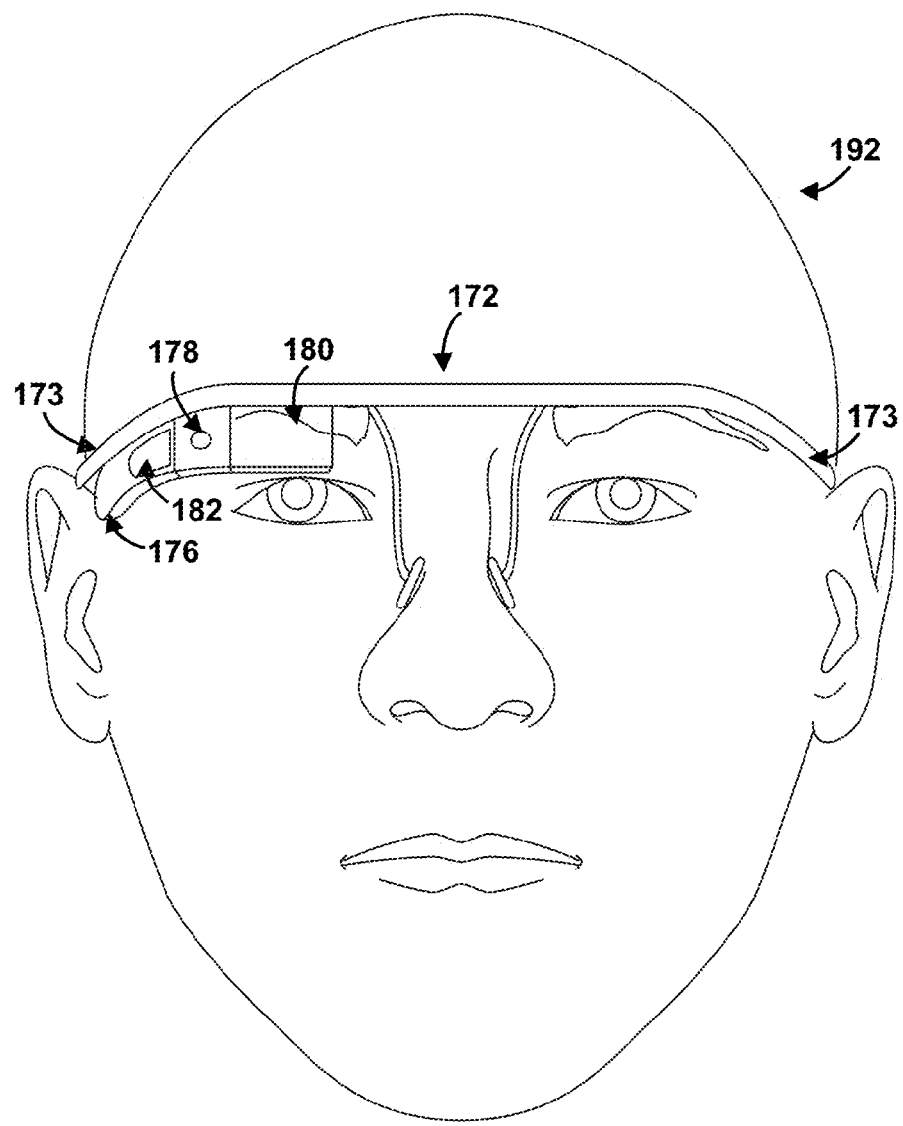
FIGS. 1E to 1G are simplified illustrations of the wearable computing system shown in FIG. 1D, being worn by a wearer.
Figure 1F:
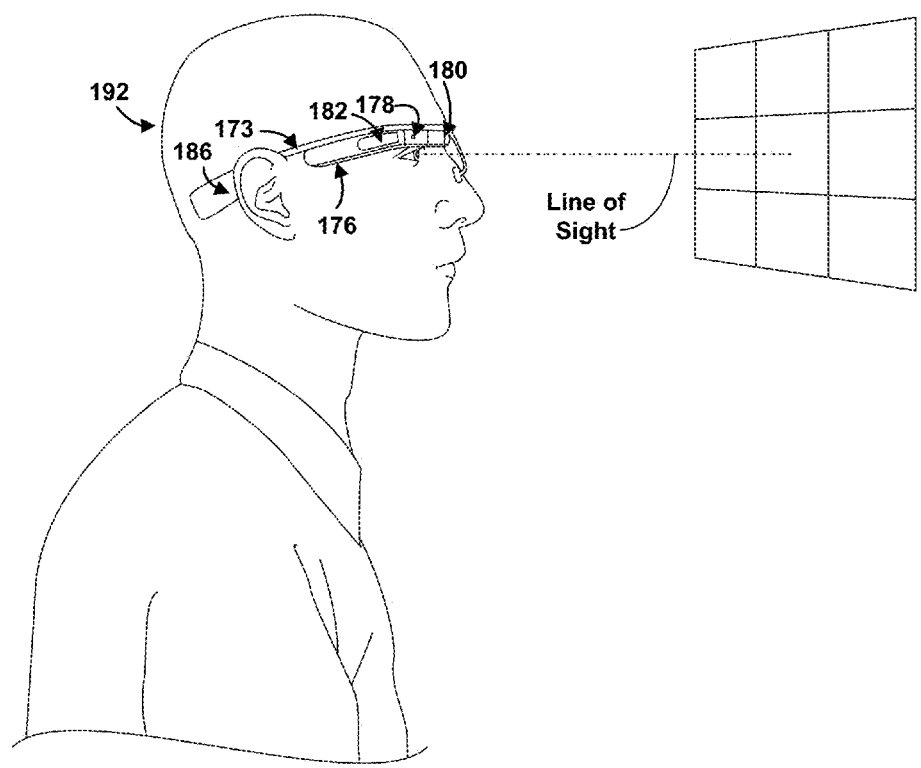
Figure 1G:
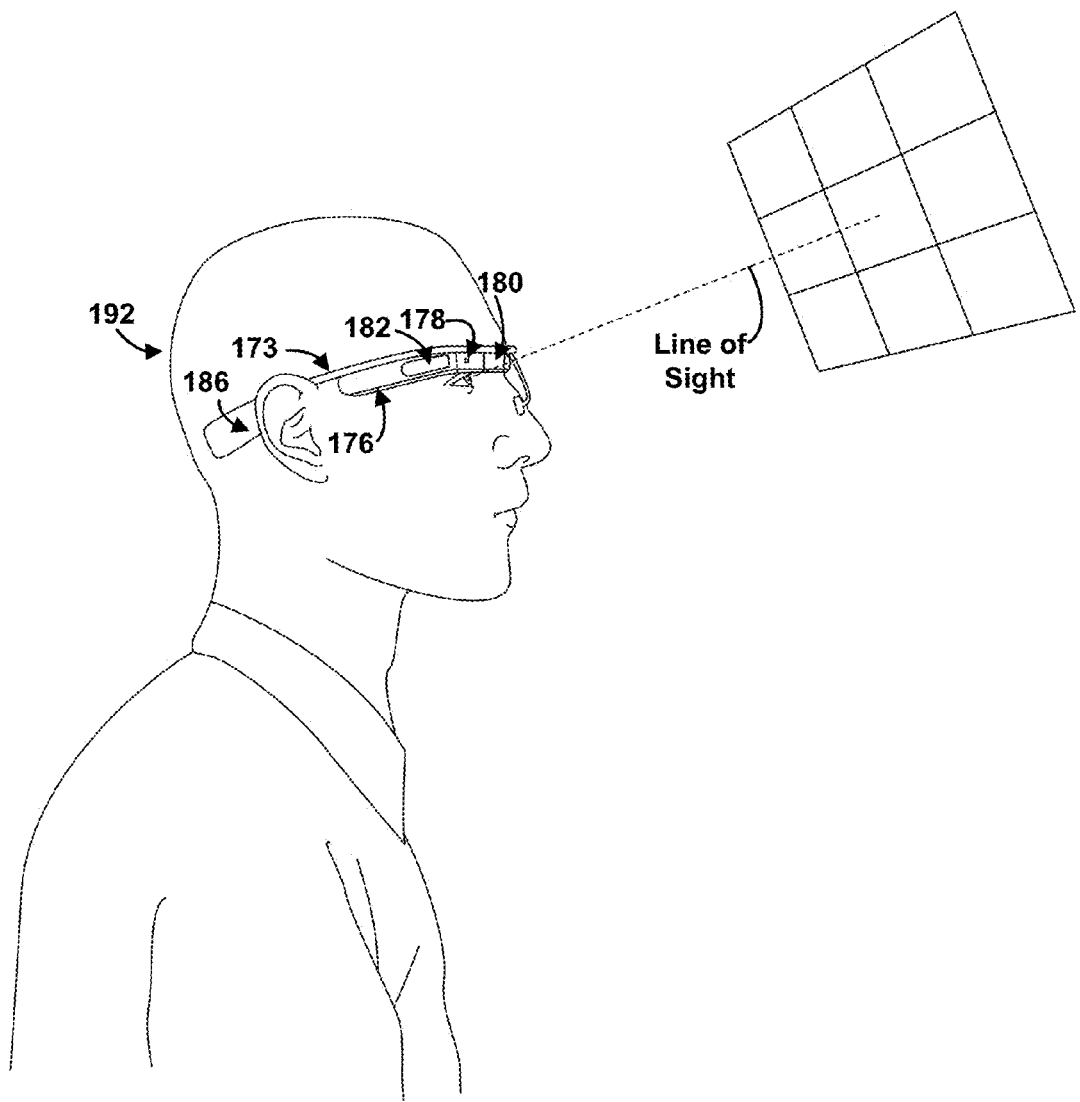

FIGS. 1E to 1G are simplified illustrations of the HMD 172 shown in FIG. 1D, being worn by a wearer 192. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 192, when HMD 172 is worn. Thus, as shown by FIG. 1F, when the wearer 192 looks forward, the wearer 192 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 192 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

FIG. 2 is a simplified block diagram of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

In a further aspect, computing device 210 may be configured to operate in locked mode and an unlocked mode (and possibly in other modes as well). In the locked mode, device 210 will typically operate with reduced functionality and/or prevent use of certain functions. For example, in a locked mode, the majority of the device's functions may be inaccessible, and only become accessible when the device is unlocked (i.e., when the device switches to the unlocked mode). In an exemplary embodiment, the device 210 does provide functionality that allows the device to receive at least some eye-movement data and at least some data corresponding to gestures on a touch-based interface, while in the locked mode. As such, device 210 may determine when an authorization scan is received, so that the device can switch from the locked mode to the unlocked mode.

C. EXAMPLES OF METHODS

Figure 3A:
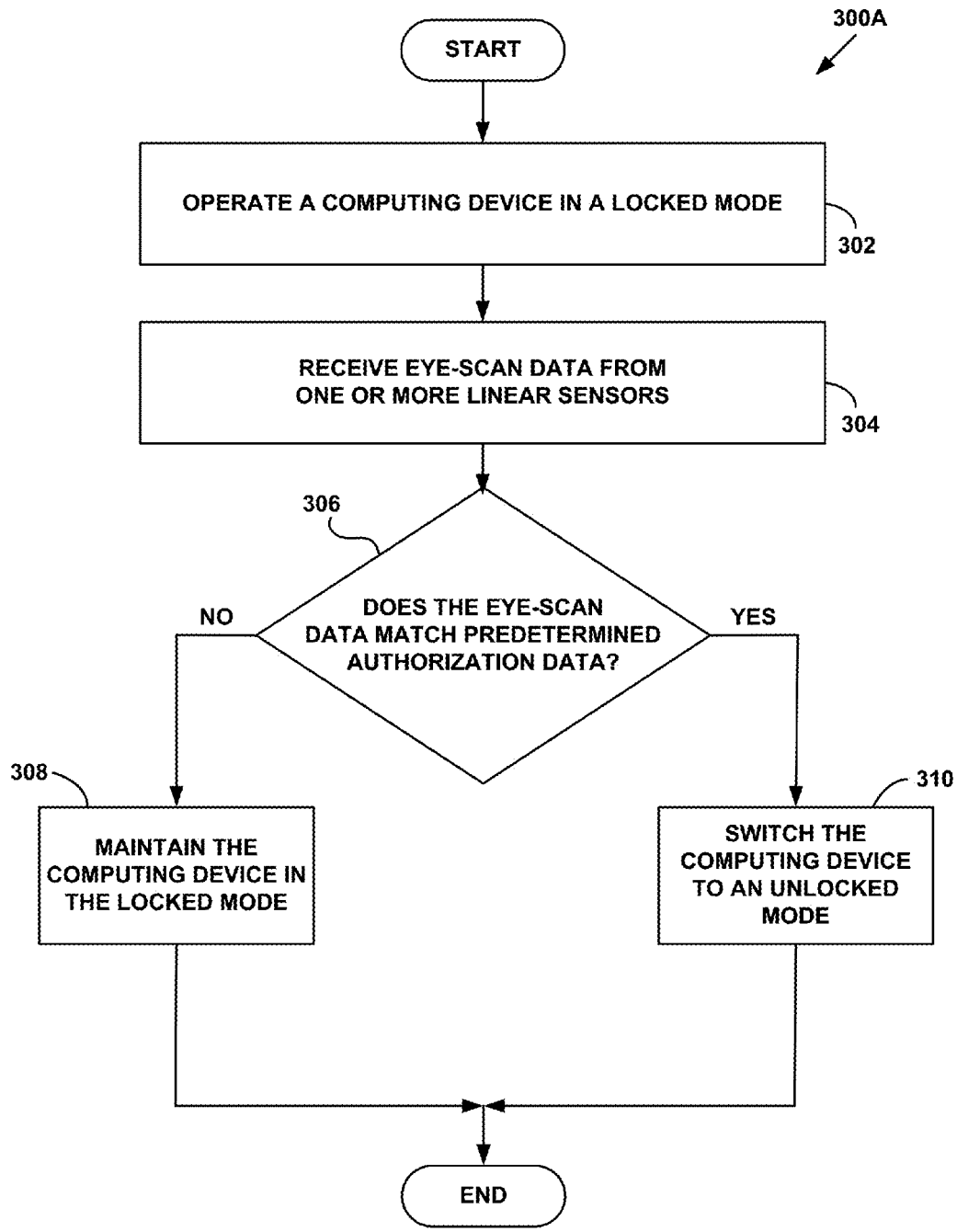
FIG. 3A is a simplified flow chart illustrating a method, according to an exemplary embodiment.
Figure 3B:
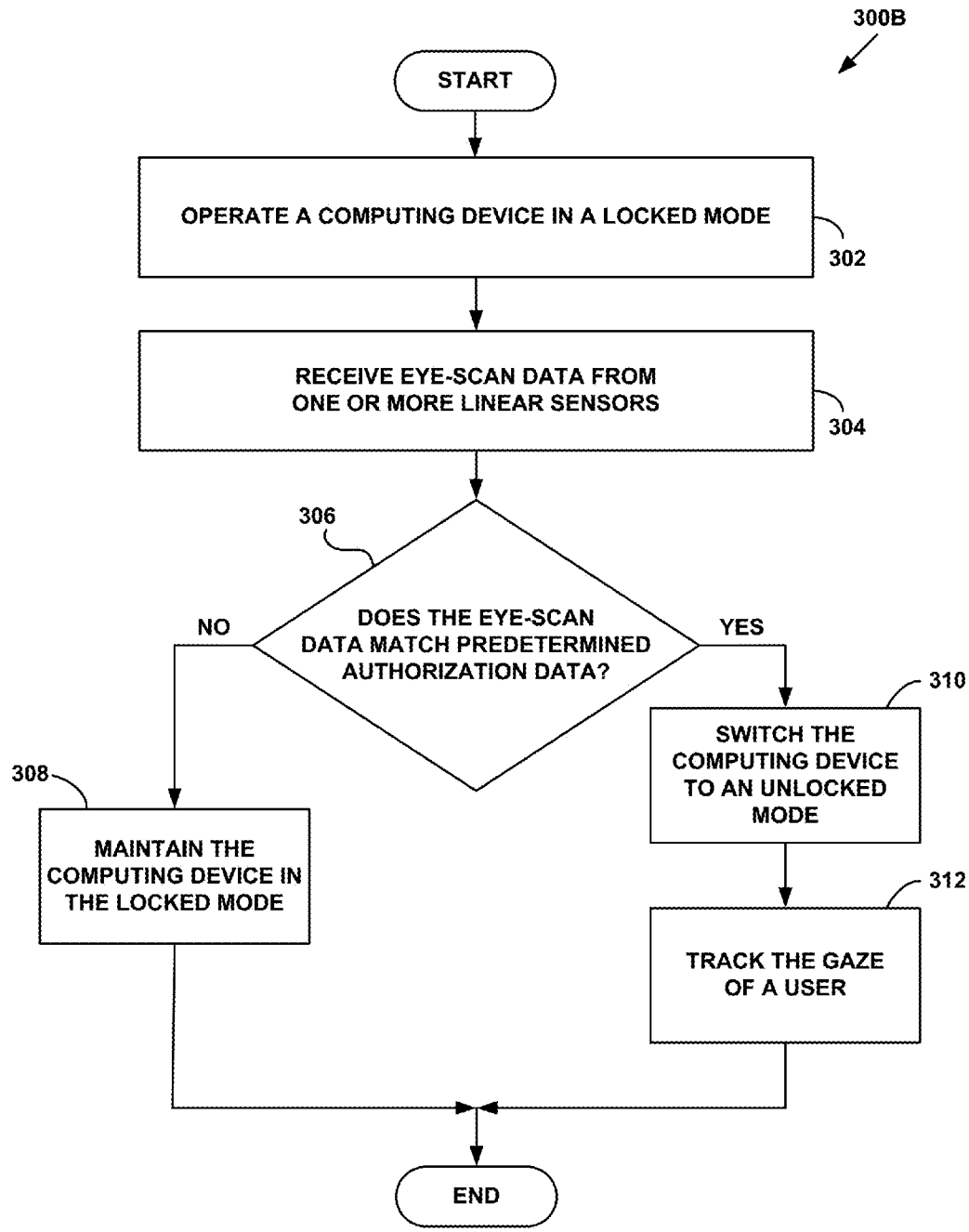
FIG. 3B is a simplified flow chart illustrating a method, according to an exemplary embodiment.
Figure 3C:
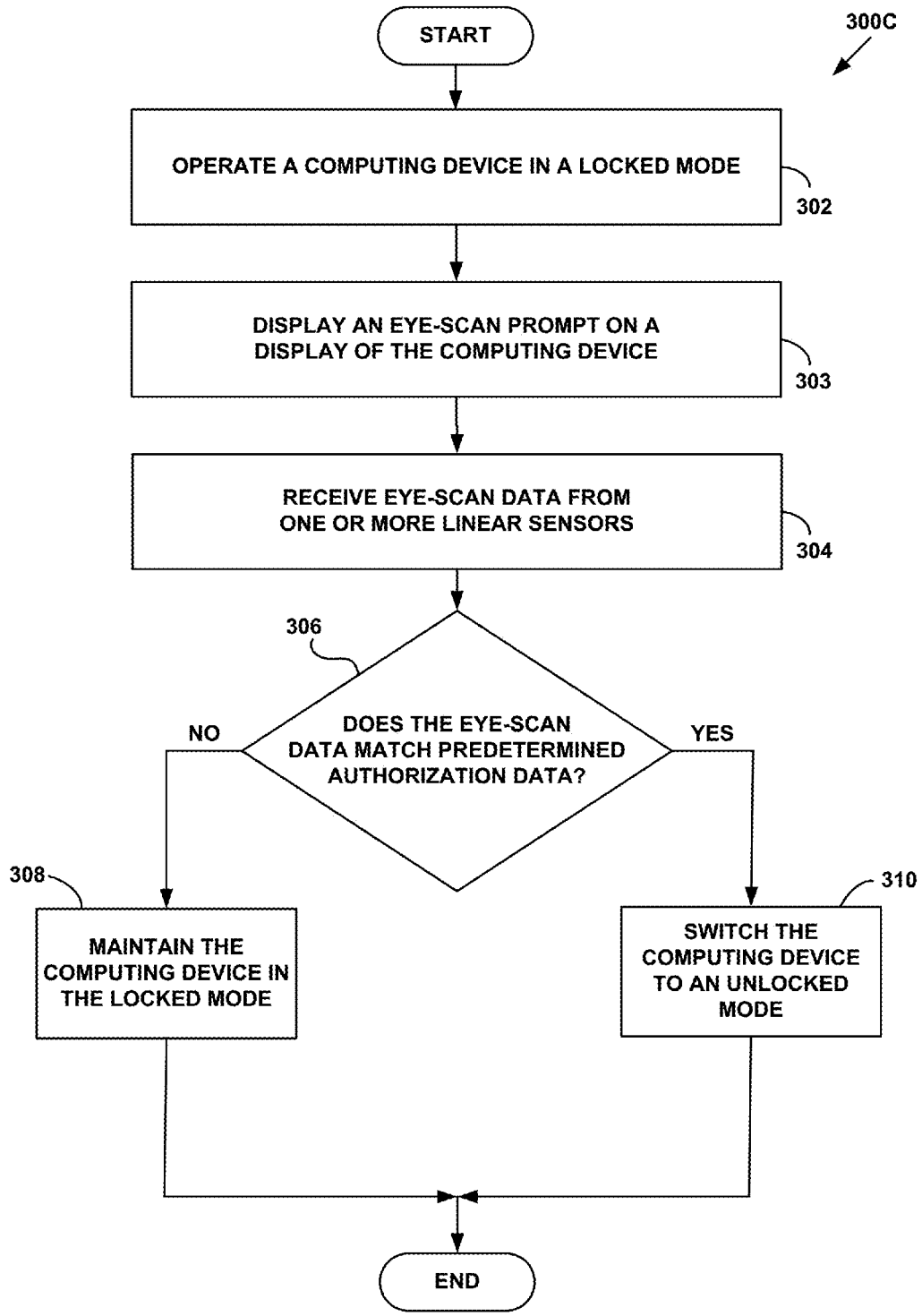
FIG. 3C is a simplified flow chart illustrating a method, according to an exemplary embodiment.

FIGS. 3A-C are simplified flow charts illustrating methods 300A-C, respectively. Although the blocks in FIGS. 3A-C are illustrated in a sequential order, these blocks may also be performed in parallel, and/or in a different order than those described herein. Also, the various blocks may be combined into fewer blocks, divided into additional blocks, and/or removed based upon the desired implementation.

Further, while the methods described herein are described by way of example as being carried out by an HMD, it should be understood that an exemplary method or a portion thereof may be carried out by another entity or combination of entities, without departing from the scope of the invention.

In addition, the flowcharts of FIGS. 3A-C show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

FIG. 3A is a simplified flow chart illustrating method 300A, according to an exemplary embodiment. At block 302, method 300A involves causing a computing device to operate in a locked mode. In the locked mode, the computing device will typically operate with reduced functionality and/or prevent use of certain functions. For example, in a locked mode, the majority of the computing device's functions may be inaccessible, and only become accessible when the device is unlocked (i.e., when the device switches to the unlocked mode). Authentication is useful as the computing device can customize content for a particular user immediately, without having to ask from more primitive forms of authentication (e.g., password, swipe pattern, etc.).

At block 304, method 300A further involves receiving eye-scan data from one or more linear sensors. In some embodiments, receiving eye-scan data from the one or more linear sensors could simply involve a computing system receiving data from an eye-scanner. In other embodiments, receiving eye-scan data could involve requesting eye-scan data, controlling the eye-scanner and causing it to perform the eye scan, and/or other functionality involved in generating and/or acquiring the eye-scan data.

In some embodiments, a computing device may process the eye-scan data before comparing it to the authorization data. For example, the computing device using the data captured by the one or more linear sensors to create, select and/or digitize an image of the eye. Individual images of the eye may be captured by the one or more linear sensors using a frame grabber during the eye-scan process. In one embodiment, the computing device may analyze the images to identify patterns in an iris, and convert the patterns into a digital template. In another embodiment, the computing device may identify patterns of light and dark image data that correspond the dark pupil and the sclera (e.g., the white of the eye) to create the digital template. In one embodiment, the digital template is a record that is compared against predetermined authorization data, as discussed below. In one embodiment, the digital template is a 1024-byte record (32×32×1 byte grayscale or color). In one embodiment, the eye-scan process takes approximately one second. Other embodiments are possible as well.

In another embodiment, the computing device may use one or more sensors, such as gyroscope(s), accelerometer(s), and/or magnetometer(s), to detect head movement and correlate images from the one or more linear sensors to a particular position on the eye. The computing device may then use the accelerometer data along with the data from the one or more linear sensors to build a two-dimensional high resolution picture of the eye.

At block 306, method 300A further involves determining whether or not the eye-scan data matches predetermined authorization data. In one embodiment, an enrollment process may be implemented to establish the predetermined authorization data. The enrollment process may involve a similar, but more detailed scan of the eye as discussed above. The linear sensors may be configured to capture several individual images of a user's eye using a frame grabber during the enrollment process. A frame grabber may be a system or module that captures digital still frames of the user's eye from the linear sensor, for example. A computing device may then analyze the patterns in the eye and convert them into a stored digital template. The stored digital template may be used as predetermined authorization data, which can be matched to a later eye scan to identify the particular user. In an example embodiment, the predetermined authorization data could take the form of a 1024-byte data record. Other formats for predetermined authorization data are possible as well.

Once the predetermined authorization data is stored in the computing device, the computing device may compare the received data and corresponding digital template with the predetermined authorization data to determine if there is a match. In one embodiment, in order to compare the predetermined authorization data with a current eye-scan data, the computing device may calculate the Hamming Distance. The Hamming Distance is a measure of the variation between the predetermined authorization data stored in the computing device and the current eye-scan data and corresponding digital template. In one embodiment, each of the 1024 bits is compared against each other, i.e. bit 1 from the current digital template and bit 1 from the stored predetermined authorization data are compared, then bit 2 and so on. Any bits that do not match are assigned a value of one and bits that do match are assigned a value of zero. Once all the bits have been compared, the number of non-matching bits is divided by the total number of bits to produce a two-digit figure of how the two records differ. In one embodiment, if such a comparison yields a Hamming Distance of 0.342 or greater, then the two records are considered to have come from two different subjects and authorization is denied. If such a comparison yields a Hamming Distance of less than 0.342, then the two records are considered to have come from the same subject and authorization is granted.

In another embodiment, principal component analysis (PCA) is applied to the predetermined authorization data to reduce the dimensionality of the image data. This technique extracts the main variations in the feature vector and allows an accurate reconstruction of the data to be produced from the extracted feature values and reduces the amount of computation needed. PCA identifies the strength of variations along different directions in the image data which involves computation of Eigen vectors and corresponding Eigen values. The Eigen vectors with largest associated Eigen values are the principal components and correspond to maximum variation in the data set. The features of the received data are then compared with the features of the stored authorization data to determine if there is a match. Other embodiments are possible as well.

If it is determined that the eye-scan data does not match the predetermined authorization data, method 300A continues at block 308 with the computing device remaining in a locked mode of operation. This may help to prevent unauthorized users from gaining access to personal information saved on the computing device.

If it is determined that the eye-scan data matches the predetermined authorization data, method 300A continues at block 310 with causing the computing device to switch between the locked mode of operation and an unlocked mode of operation, wherein the unlocked mode allows a greater level of functionality for the user.

In one embodiment, after authenticating the user, the computing device can continuously verify the user during use. For example, as the user's eyes saccade through normal use of the computing device, sections of the user's eye scan past the one or more linear sensors. The computing device may reconstruct those sections of the user's eye and compare it with the authenticated user. If at some point during use the computing system cannot find a good match for the sections of the user's eye, the computing device can begin operating in a locked mode and request the user to re-authenticate.

FIG. 3B is a simplified flow chart illustrating an additional method 300B, according to an exemplary embodiment. Method 300B is similar to method 300A, with an additional step at block 312. At block 312, responsive to switching the computing device to the unlocked mode, method 300B may continue with tracking the gaze of a user based on data from the one or more linear sensors. In one embodiment, the gaze of the user may be tracked with a single linear sensor by detecting dark and/or light regions of the eye-scan. The location of the dark and/or light region of the eye-scan is an indication of where the pupil is located. In certain lighting, the pupil will likely be at the location indicated by a dark region of the eye-scan based on data from the linear sensor. However, light entering the eye at a certain angle may be reflected from the optic nerve at the back of the eye. In such cases, the light becomes magnified and the pupil of the eye may appear bright white in color. Therefore, tracking the gaze of a user may involve detecting either dark or light regions of the eye-scan, and determining a location of the pupil based on the location of the dark and/or light region. Further, the gaze direction can be correlated to the real-world environment and/or a virtual image.

In another embodiment, as the user's eye scans past the linear sensor, the computing device can examine the motion of the pixels to determine how the eye is moving. In yet another embodiment, since the computing system has a map of the eye from the authentication process and the position of the linear sensor on the computing device is known, the computing device can track the gaze of the user. For example, by using the map of the eye and a given pixel pattern captured during eye movement, the computing device can determine the most probable position of the eye, and therefore estimate a gaze direction. Other embodiments are possible as well.

In some embodiments, a second linear sensor may be oriented differently to perform two-dimensional tracking. In such an embodiment, the two linear sensors may be arranged orthogonally with respect to one another. However, the two linear sensors could also be arranged in a non-orthogonal manner. Each linear sensor may be configured to detect the light and/or dark regions on each respective axis. For example, one linear sensor may be configured to detect the light and/or dark region on an axis parallel to the ground (x-axis) and another linear sensor may be configured to detect the light and/or dark region on an axis perpendicular to the ground (y-axis).

Figure 4:
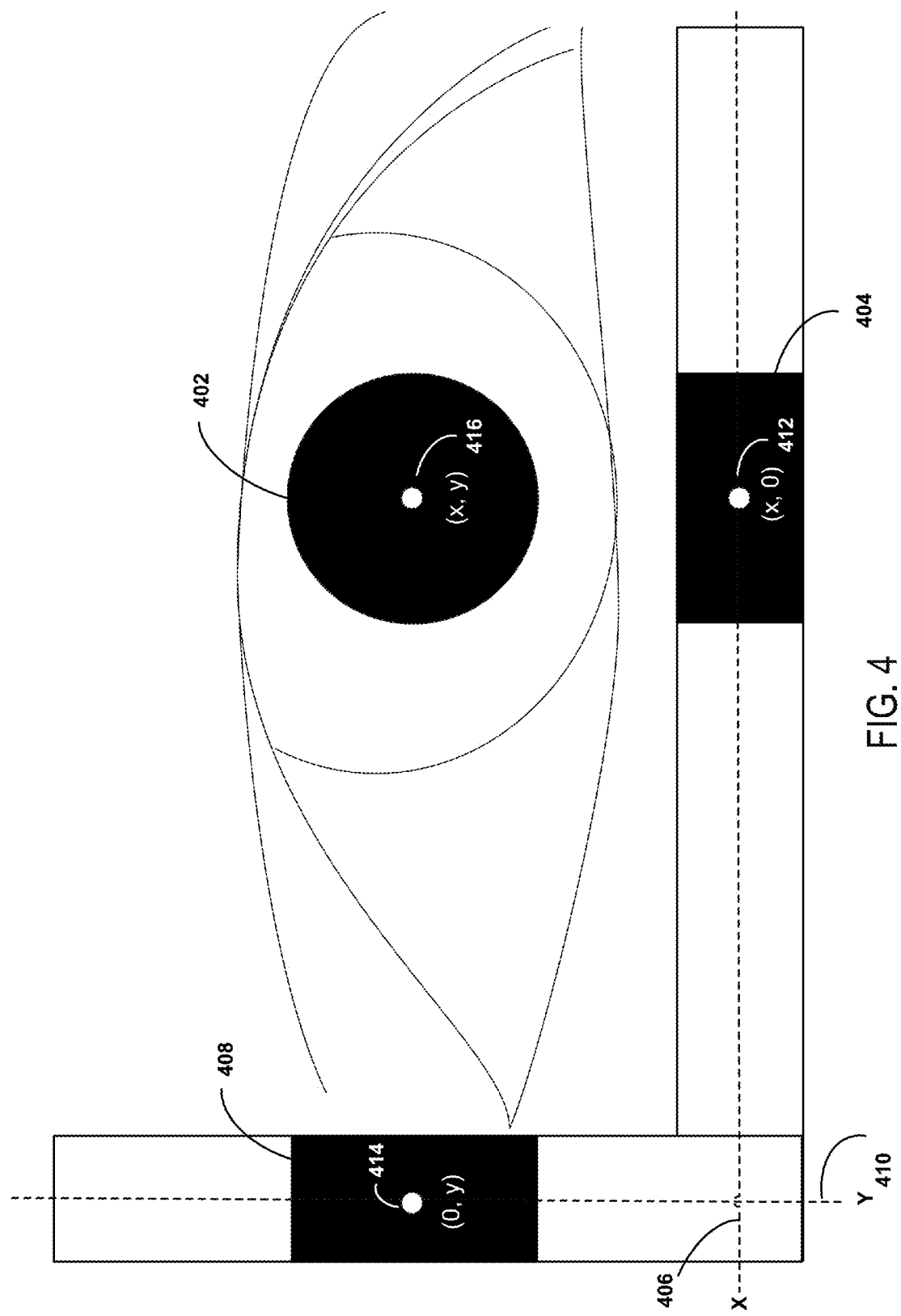
FIG. 4 is an infrared image of an eye displaying the location of dark regions on each respective axis.

FIG. 4 represents an infrared image of the eye of a user displaying the location of dark regions on each respective axis based on data from the linear sensors. As noted above, tracking the gaze of a user may involve detecting either dark or light regions of the eye-scan. As discussed above, the gaze of a user may be tracked by determining the location of the pupil 402. A horizontally positioned linear sensor, such as linear sensor 136 shown in FIG. 1B or linear sensor 188 shown in FIG. 1D, may detect the light and/or dark region 404 on the x-axis 406. A vertically positioned linear sensor, such as linear sensor 138 shown in FIG. 1B or linear sensor 190 shown in FIG. 1D, may detect the light and/or dark region 408 on the y-axis 410. The x-axis coordinate 412 and y-axis coordinate 414 may then be combined to determine the (x, y) location of the pupil 416. Such a configuration allows for two-dimensional gaze tracking with higher resolution than a typical two-dimensional sensor while using less total pixels.

Further, the gaze direction can be correlated to the real-world environment and/or a virtual image. Tracking the gaze of a user is useful for providing an input interface for a computing device that avoids the need for the user to control the system with their hands. In one embodiment, in response to the gaze tracking, the computing device is further configured to update or modify the virtual image viewable by the user. The virtual image may be updated or modified in response to the gaze tracking by changing the location, size, brightness, content, and/or other properties thereof.

For example, in response to determining that a user's eye is focused on a sign on a sidewalk for a particular bus route, the virtual image can be modified to provide additional information for the bus route, such as an estimated time of arrival for the next bus, an estimated travel time to arrive at a predetermined destination if riding the bus, a required fare for the bus, etc. In another example, in response to determining that the user's eye is focused on an icon in the virtual image that indicates a new email or text message has been received, the virtual image can be modified to display the email or text message.

Further, the processor of the computing device can also be configured to control other components of the display system in response to the gaze tracking. One or more input/output (I/O) components may be coupled to the gaze tracking. Such I/O components may include a speaker, a transmitter and receiver for communicating with other devices, and a microphone. As an example, in response to the processor identifying that the user's eye(s) are focused on an icon in the virtual image that indicates a voicemail has been received, I/O components may be controlled to play the voicemail to the user through a speaker. In another example, in response to the processor identifying that the user's eye(s) are focused on an icon in the virtual image to return a missed call, the I/O components may be controlled to initiate a call to the missed call phone number. Other embodiments are possible as well.

FIG. 3C is a simplified flow chart illustrating an additional method 300C, according to an exemplary embodiment. Method 300C is similar to method 300A, with an additional step at block 303. At block 303, method 300C involves displaying an eye-scan prompt on a display of the computing device. In one embodiment, the eye-scan prompt is a visual prompt displayed on a display of the computing device. In another embodiment, the eye-scan prompt is an audible prompt played out by a speaker of the computing device.

In one embodiment, the eye-scan prompt may involve displaying a moving object on the display of the computing device and displaying an indication to track the moving object. It should be noted that it is not necessary to separately display the indication to track an object on the display of the computing device. The fact that an object is displayed may in of itself be interpreted as an indication to track the object.

Figure 5A:
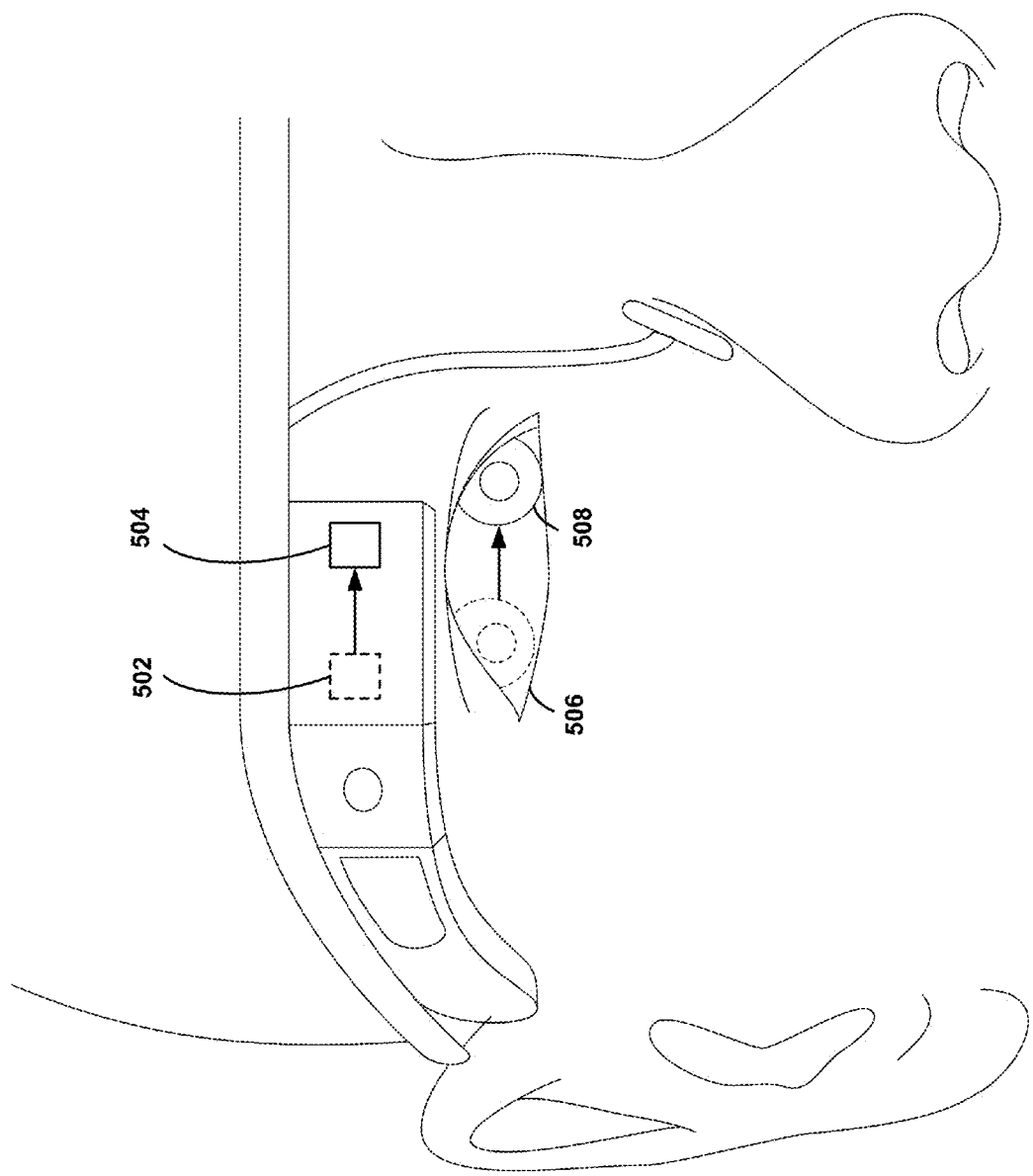
FIG. 5A illustrates a wearer tracking an object displayed on a wearable computing system according to an exemplary embodiment.

FIG. 5A illustrates a wearer tracking an object 502, 504 displayed on a wearable computing system according to an exemplary embodiment. The object is first displayed at a first location 502. The object then moves on the display to a second location 504. The user tracks the object by focusing their eye on the object as it moves across the display. The user's eye moves from a first location 506, to a second location 508. This movement of the eye exposes may help to expose the entire iris, or at least a substantial portion thereof, to the one or more linear sensors, allowing for a more detailed scan for authentication purposes. In some embodiments, the object may move back and forth until a successful scan of the eye is completed. Multiple scans may provide a more detailed digital template to the computing system since the linear sensors will have more time to capture individual images of a user's eye.

In another embodiment, the eye-scan prompt may involve displaying a stationary object on the display of the computing device and displaying an indication to track the stationary object while turning the user's head left and right along a transverse plane. In another embodiment, the eye-scan prompt may involve displaying an indication to fixate on a particular location while turning the user's head left and right along a transverse plane. By instructing the user to fixate on a particular location (either an object displayed on the computing device or a particular location in the distance) while turning the user's head left and right, the user's vestitbulo-ocular reflex is exposed. The vestibule-ocular reflex is a reflex eye movement that stabilizes images on the retina during head movement by producing an eye movement in the direction opposite to the head movement, thus preserving the image on the center of the visual field. For example, when the head moves to the right, the eye moves to the left, and vice versa.

Further, as the user turns his or her head left and right along a transverse plane, a gyroscope may be used to detect the head movement and re-render the stationary object to compensate for the head movement. In another embodiment, a magnetometer may be used. In yet another embodiment, an accelerometer may be used. Other embodiments and combinations are possible as well.

Figure 5B:
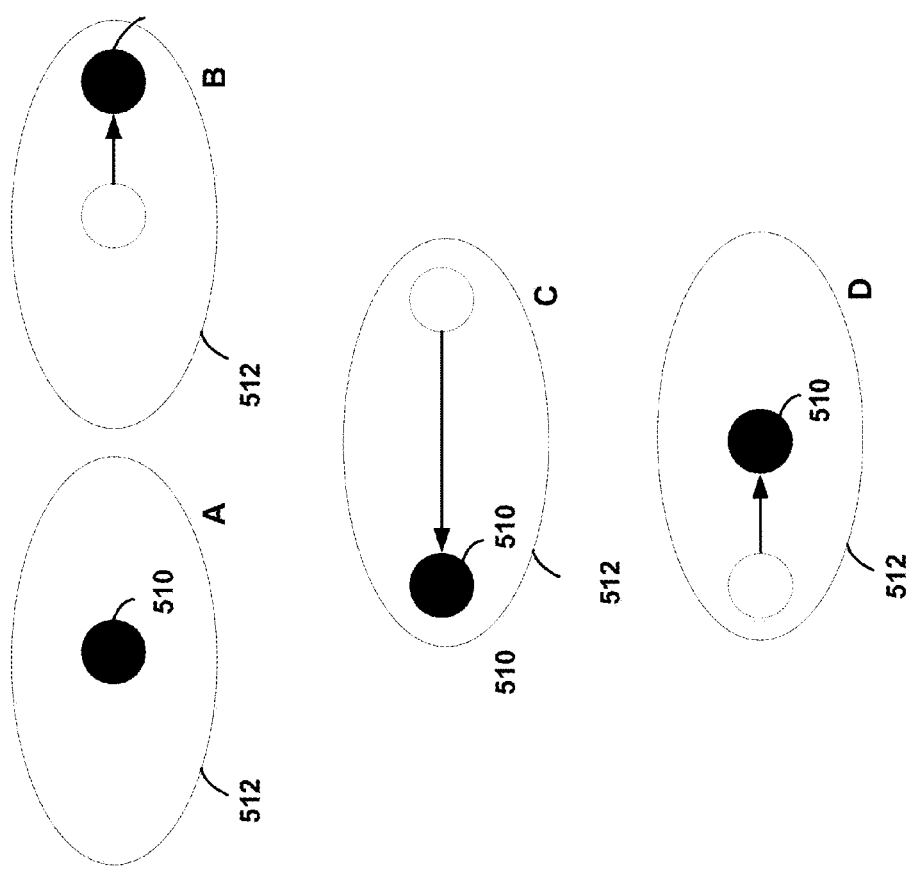
FIG. 5B illustrates the movement of a pupil while tracking a stationary object according to an exemplary embodiment.

FIG. 5B illustrates the movement of a pupil while tracking a stationary object according to example embodiments discussed above. In relation to FIG. 5B, as the user fixates on a particular location while turning the user's head left and right, the pupil 510 of the user's eye 512 moves left and right as well. FIG. 5B illustrates the various positions of the eye of a user while tracking a stationary object, thus exposing the entire iris to the one or more linear sensors allowing for a detailed scan of the eye for authentication purposes. In one embodiment, the computing device may instruct the user to continue to turn the user's head left and right until a successful scan of the eye is completed.

In another embodiment, the eye-scan prompt may involve displaying an indication to perform one or more hand gestures. For example, the indication to perform one or more hand gestures may involve displaying an indication to place one or more fingers at arm's length, displaying an indication to move the one or more fingers left and right along a transverse plane, and displaying an indication to track the one or more fingers while keeping the user's head stationary.

Figure 5C:
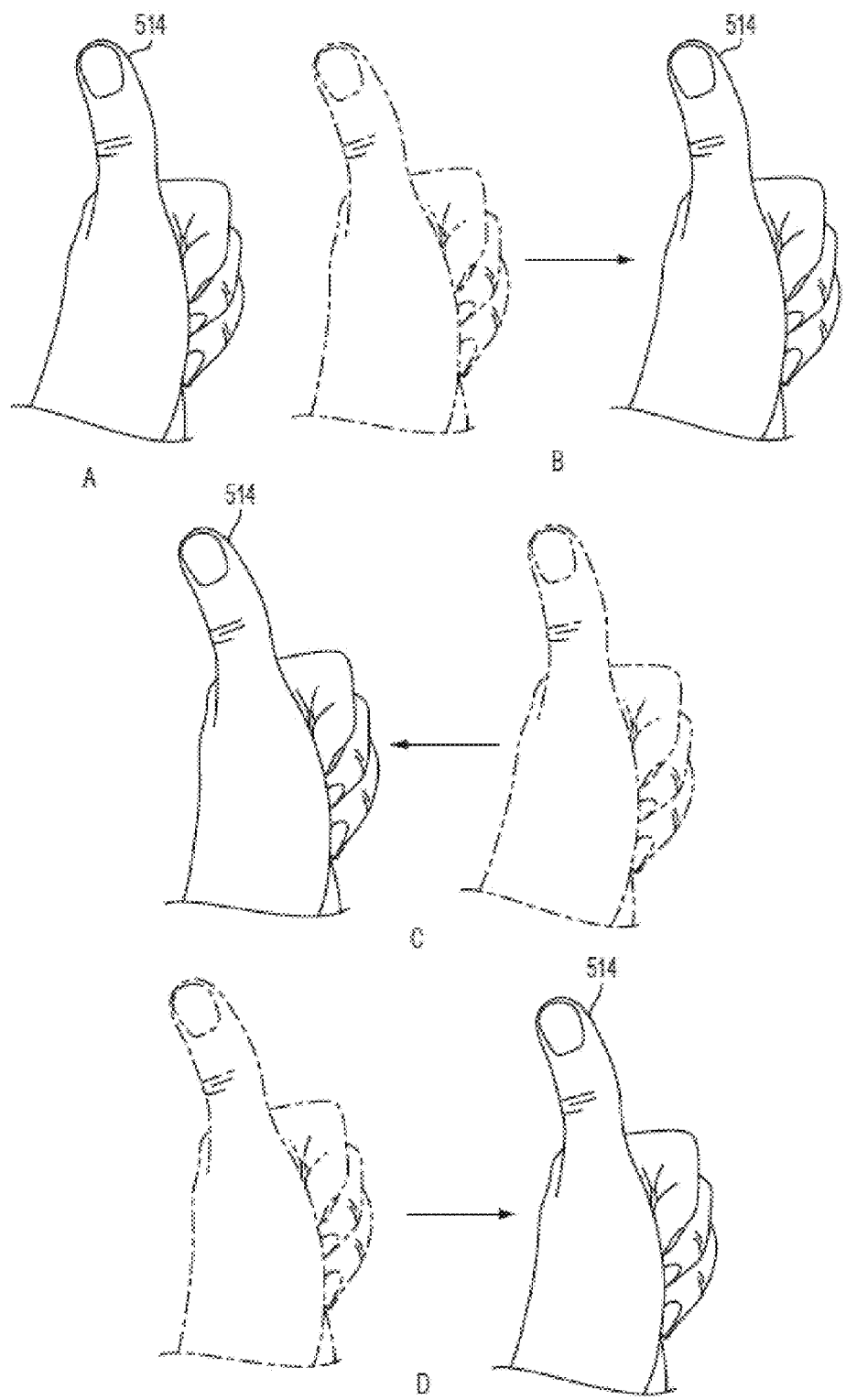
FIG. 5C illustrates a hand gesture corresponding to an eye-scan prompt according to an exemplary embodiment.

FIG. 5C illustrates a hand gesture corresponding to an eye-scan prompt according to an exemplary embodiment. In FIG. 5C, the thumb 514 of the user is placed at arm's length. As the user moves their thumb 514 left and right along a transverse plane, the eye of the user tracks the thumb. Each location of the thumb 514 (A-D) in FIG. 5C corresponds to the location of the pupil 510 (A-D) in FIG. 5B. This movement of the eye exposes the entire iris to the one or more linear sensors, allowing for a more detailed scan for authentication purposes. In one embodiment, the user may move their thumb back and forth until a successful scan of the eye is completed.

In another example, the indication to perform one or more hand gestures may involve displaying an indication to place one or more fingers at arm's length, displaying an indication to keep the one or more fingers stationary, and displaying an indication to turn the user's head left and right along a transverse plane. Such an embodiment exposes the user's vestitbulo-ocular reflex as discussed in relation to FIG. 5B. Other embodiments are possible as well.

In some embodiments, two or more of the eye-scan may involve discussed above are stored by the computing device. As such, the computing device may utilize different prompts at different times. For example, in some embodiments, the eye-scan prompt displayed to the user may be randomly generated by the computing system of the computing device. In other embodiments, the eye-scan prompt that is utilized may be selected by the user (e.g., via a setting in the user's preferences).

Further, in some embodiments, a computing device can intelligently select a prompt that is appropriate for a given situation. For example, if the user is sitting on their couch, the computing device may prompt the user to track a moving object on the display of the computing device. However, if the user is walking, the computing device may recognize that prompting the user to track a moving object on the display of the computing device may be dangerous, since the user would have to take their eye off of where they are walking. In such a scenario, the computing device may instead prompt the user to focus on the path ahead while turning their head to complete the scan. Other embodiments are possible as well.

D. COMPUTER-READABLE MEDIUM CONFIGURED TO AUTHORIZE A USER AND TRACK THE GAZE OF THE USER

Figure 6:
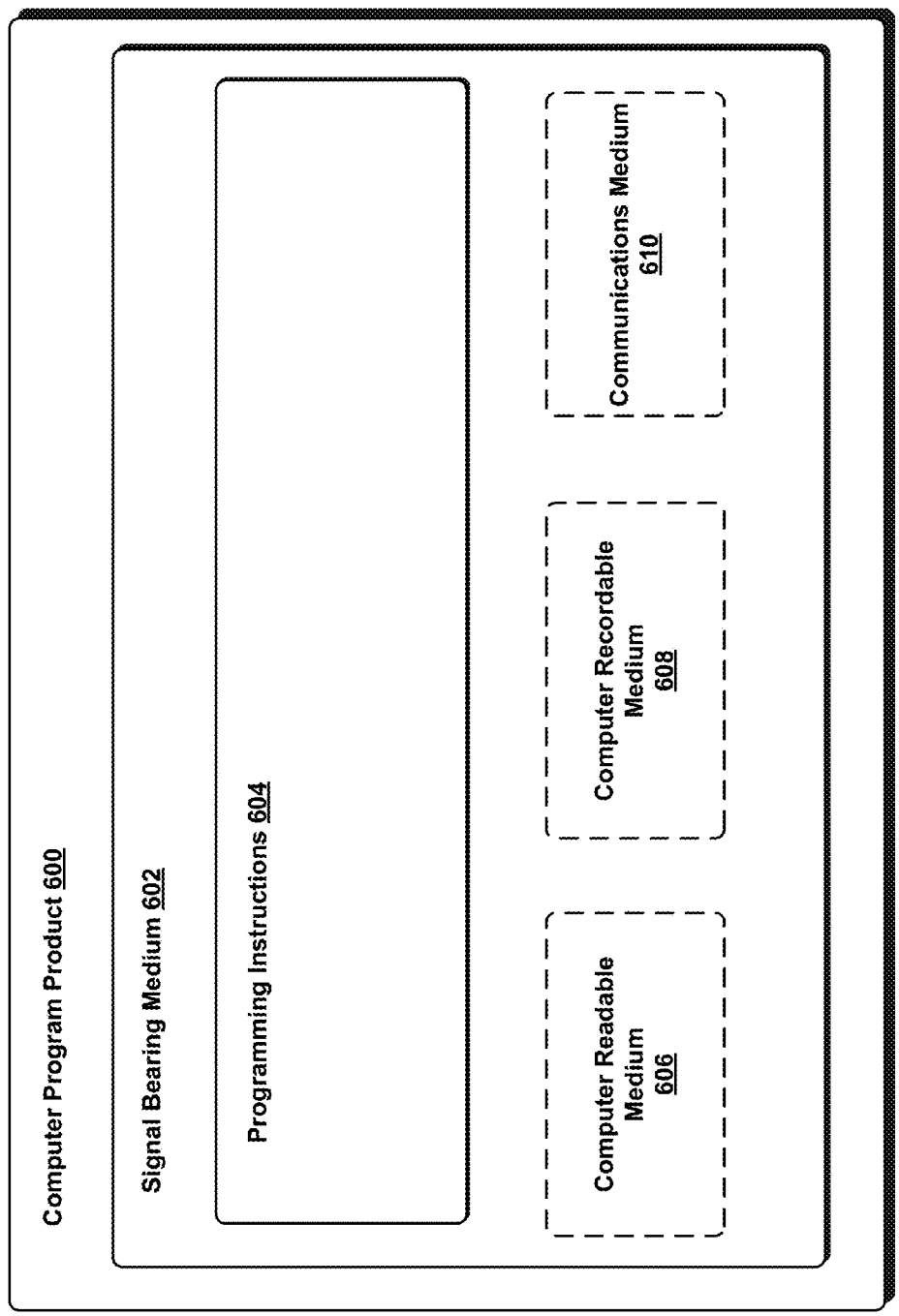
FIG. 6 depicts a computer-readable medium configured according to an example embodiment.

FIG. 6 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1A to 5C. In some examples, the signal bearing medium 602 can be a computer-readable medium 606, such as, but not limited to, a hard disk drive, a Compact Disc (CD), a Digital Video Disk (DVD), a digital tape, memory, etc. In some implementations, the signal bearing medium 602 can be a computer recordable medium 608, such as, but not limited to, memory, read/write (R/W) CDs, R/W DVDs, etc. In some implementations, the signal bearing medium 602 can be a communications medium 610, such as, but not limited to, a digital and/or an analog communication medium (e.g., a fiber optic cable, a waveguide, a wired communications link, a wireless communication link, etc.). Thus, for example, the signal bearing medium 602 can be conveyed by a wireless form of the communications medium 610.

The one or more programming instructions 604 can be, for example, computer executable and/or logic implemented instructions. In some examples, a computing device such as the processor 214 of FIG. 2 is configured to provide various operations, functions, or actions in response to the programming instructions 604 conveyed to the processor 214 by one or more of the computer-readable medium 606, the computer recordable medium 608, and/or the communications medium 610.

The non-transitory computer-readable medium could also be distributed among multiple data storage elements, which could be remotely located from each other. The computing device that executes some or all of the stored instructions could be an HMD, such as those illustrated in FIGS. 1A to 1G. Alternatively, the computing device that executes some or all of the stored instructions could be another computing device, such as a server.

E. CONCLUSION

The above detailed description describes various features and functions of the disclosed systems, devices, and methods with reference to the accompanying Figures. In the Figures, similar symbols typically identify similar components, unless context dictates otherwise. The illustrative embodiments described in the detailed description, Figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
while a head-mountable device (HMD) is operating in a locked mode, determining a velocity of the HMD;
comparing the determined velocity of the HMD to a threshold velocity;
based at least in part on the comparison, selecting a particular eye-scan prompt from a plurality of possible eye-scan prompts;
causing a display of the HMD to display the selected eye-scan prompt;
in response to the selected eye-scan prompt displayed by the HMD, receiving two-dimensional eye-scan data corresponding to an eye from a first linear sensor and a second linear sensor;
determining that the two-dimensional eye-scan data matches predetermined eye-scan authorization data; and
responsive to determining that the two-dimensional eye-scan data matches the predetermined eye-scan authorization data, causing the HMD to switch from operating in the locked mode to operating in an unlocked mode, wherein functionality of the HMD is reduced in the locked mode as compared to in the unlocked mode.

2. The method of claim 1, further comprising:
responsive to switching the HMD to the unlocked mode of operation, tracking a gaze based on the two-dimensional eye-scan data.

3. The method of claim 2, wherein tracking the gaze comprises:
determining a dark region of the two dimensional eye-scan data; and
determining a location of a pupil based on a location of the dark region.

4. The method of claim 2, wherein tracking the gaze comprises:
determining a light region of the two-dimensional eye-scan data; and
determining a location of a pupil based on a location of the light region.

5. The method of claim 1, wherein causing the HMD to display the selected eye-scan prompt comprises at least one of: (a) causing the display of the HMD to display a visual eye-scan prompt and (b) causing a speaker associated with the HMD to play out an audible eye-scan prompt.

6. The method of claim 1, wherein the selected eye-scan prompt comprises:
displaying a moving object on the display of the HMD; and
displaying an indication to track the moving object.

7. The method of claim 1, wherein the selected eye-scan prompt comprises:
displaying a stationary object on the display of the HMD; and
displaying an indication to track the stationary object while turning a head left and right.

8. The method of claim 1, wherein the selected eye-scan prompt comprises displaying an indication to fixate on a particular location while turning a head left and right.

9. A head-mountable device (HMD) comprising:
a first linear sensor arranged to sense an eye in a first dimension;
a second linear sensor arranged to sense the eye in a second dimension;
a non-transitory computer-readable medium; and
program instructions stored on the non-transitory computer-readable medium and executable by at least one processor to:
while the HMD is operating in a locked mode, determine a velocity of the HMD;
compare the determined velocity of the HMD to a threshold velocity;
based at least in part on the comparison, select a particular eye-scan prompt from a plurality of possible eye-scan prompts;
cause a display of the HMD to display the selected eye-scan prompt;
in response to the selected eye-scan prompt displayed on the HMD, receive two-dimensional eye-scan data corresponding to the eye from the first linear sensor and the second linear sensor;
determine that the two-dimensional eye-scan data matches predetermined eye-scan authorization data; and
responsive to determining that the two-dimensional eye-scan data matches the predetermined eye-scan authorization data, cause the HMD to switch from operating in the locked mode to operating in an unlocked mode, wherein functionality of the HMD is reduced in the locked mode as compared to in the unlocked mode.

10. The HMD of claim 9, wherein the first linear sensor and the second linear sensor are located on a frame of the HMD.

11. The HMD of claim 9, wherein the processor is further configured to use the two-dimensional eye-scan data as a basis for a gaze-tracking process.

12. The HMD of claim 11, wherein the processor is further configured to control an operation of the HMD in response to gaze data generated by the gaze-tracking process.

13. A non-transitory computer-readable medium having stored thereon instructions executable by a head-mountable device (HMD) to cause the HMD to perform functions comprising:
while a head-mountable device (HMD) is operating in a locked mode, determining a velocity of the HMD;
comparing the determined velocity of the HMD to a threshold velocity;
based at least in part on the comparison, selecting a particular eye-scan prompt from a plurality of possible eye-scan prompts;
causing a display of the HMD to display the selected eye-scan prompt;
in response to the selected eye-scan prompt displayed by the HMD, receiving two-dimensional eye-scan data corresponding to an eye from a first linear sensor and a second linear sensor;
determining that the two-dimensional eye-scan data matches predetermined eye-scan authorization data; and
responsive to determining that the two-dimensional eye-scan data matches the predetermined eye-scan authorization data, causing the HMD to switch from operating in the locked mode to operating in an unlocked mode, wherein functionality of the HMD is reduced in the locked mode as compared to in the unlocked mode.

14. The non-transitory computer-readable medium of claim 13, wherein the functions further comprise:
responsive to switching the HMD to the unlocked mode of operation, tracking a gaze based on the two-dimensional eye-scan data.

15. The non-transitory computer-readable medium of claim 14, wherein the function of tracking the gaze comprises:
determining a dark region of the two-dimensional eye-scan data based on data; and
determining a location of a pupil based on a location of the dark region.

16. The non-transitory computer-readable medium of claim 14, wherein the function of tracking the gaze comprises:
determining a light region of the two-dimensional eye-scan data based on data; and
determining a location of a pupil based on a location of the light region.

17. The method of claim 1, wherein the selected eye-scan prompt comprises displaying an indication to perform one or more hand gestures.

18. The method of claim 17, wherein the one or more hand gestures comprise:
displaying an indication to extend one or more fingers in front of the eye;
displaying an indication to move the one or more fingers left and right along a transverse plane; and
displaying an indication to track the one or more fingers while keeping a head stationary.

19. The method of claim 17, wherein the one or more hand gestures comprise:
displaying an indication to extend one or more fingers in front of the eye; and
displaying an indication to fixate on the one or more fingers while turning a head left and right.

* * * * *